(12) United States Patent
Kamada

(10) Patent No.: US 11,577,803 B2
(45) Date of Patent: Feb. 14, 2023

(54) DERAILLEUR FOR HUMAN-POWERED VEHICLE

(71) Applicant: Shimano Inc., Sakai (JP)

(72) Inventor: Kenji Kamada, Sakai (JP)

(73) Assignee: Shimano Inc., Sakai (JP)

( * ) Notice: Subject to any disclaimer, the term of this patent is extended or adjusted under 35 U.S.C. 154(b) by 387 days.

(21) Appl. No.: 16/698,815

(22) Filed: Nov. 27, 2019

(65) Prior Publication Data

US 2021/0155317 A1  May 27, 2021

(51) Int. Cl.
  *B62M 9/1248*  (2010.01)
  *B62M 9/122*  (2010.01)
  *B62M 9/124*  (2010.01)

(52) U.S. Cl.
  CPC .......... *B62M 9/1248* (2013.01); *B62M 9/122* (2013.01); *B62M 2009/12406* (2013.01)

(58) Field of Classification Search
  CPC ............... B62M 9/1248; B62M 9/122; B62M 2009/12406
  USPC .......................................................... 474/80
  See application file for complete search history.

(56) References Cited

U.S. PATENT DOCUMENTS

| | | | |
|---|---|---|---|
| 4,692,131 A * | 9/1987 | Nagano | B62M 9/1248 474/82 |
| 5,358,451 A * | 10/1994 | Lacombe | B62M 9/124 474/78 |
| 5,961,409 A * | 10/1999 | Ando | B62M 9/1244 474/82 |
| 2012/0214628 A1 * | 8/2012 | Johnson | B62M 9/1244 474/80 |
| 2015/0367750 A1 | 12/2015 | Takamoto et al. | |
| 2018/0281899 A1 * | 10/2018 | Bernardele | B62M 9/124 |
| 2018/0346058 A1 * | 12/2018 | Brown | B62M 9/126 |
| 2019/0016412 A1 * | 1/2019 | Emura | B62M 9/126 |
| 2019/0047660 A1 * | 2/2019 | Yang | B62M 9/1248 |

FOREIGN PATENT DOCUMENTS

JP  2016-007905 A  1/2016

* cited by examiner

*Primary Examiner* — Gene O Crawford
*Assistant Examiner* — Emily R Kincaid

(57) ABSTRACT

A derailleur comprises a base member configured to be attached to a human-powered vehicle frame, a movable member movable with respect to the base member, a pulley assembly pivotally attached to the movable member in a first pivotal direction and a second pivotal direction opposite to the first pivotal direction and including a first pulley having a first pulley axis and a second pulley having a second pulley axis, a pulley assembly biasing member configured to bias the pulley assembly with respect to the movable member in the first pivotal direction, a pulley distance (centimeter) being defined between the first pulley axis and the second pulley axis, a biasing return force (newton) being defined by rotational force of the pulley assembly relative to the movable member, and a return value defined by the biasing return force multiplied by the pulley distance. The return value is 136 or larger.

21 Claims, 13 Drawing Sheets

DERAILLEUR FOR HUMAN-POWERED VEHICLE

BACKGROUND

The present disclosure relates to a human-powered vehicle derailleur.

Patent Document 1 discloses an example of a human-powered vehicle derailleur including a pulley assembly biasing member. The pulley assembly biasing member biases a pulley assembly so that the position of the pulley assembly relative to a movable member shifts from a second rotational position toward a first rotational position.
Patent Document 1: Japanese Laid-Open Patent Publication No. 2016-7905

SUMMARY

One object of the present disclosure is to provide a human-powered vehicle derailleur that sets rotational force of a pulley assembly relative to a movable member in a preferred state.

In accordance with a first aspect of the present disclosure, a human-powered vehicle derailleur comprises a base member configured to be attached to a human-powered vehicle frame, a movable member movable with respect to the base member, a pulley assembly pivotally attached to the movable member in a first pivotal direction and in a second pivotal direction opposite to the first pivotal direction, the pulley assembly including a first pulley having a first pulley axis and a second pulley having a second pulley axis, a pulley assembly biasing member configured to bias the pulley assembly with respect to the movable member in the first pivotal direction, a pulley distance (centimeter) being defined between the first pulley axis and the second pulley axis, a biasing return force (newton) being defined by rotational force of the pulley assembly relative to the movable member, and a return value defined by the biasing return force multiplied by the pulley distance. The return value is equal to or larger than 136.

In the derailleur according to the first aspect, the return value is equal to or larger than 136. This allows rotational force of the pulley assembly relative to the movable member to be in a preferred state.

In accordance with a second aspect of the present disclosure, the derailleur according to the first aspect is configured so that the return value is equal to or larger than 300.

In the derailleur according to the second aspect, the return value is equal to or larger than 300. This allows rotational force of the pulley assembly relative to the movable member to be in a preferred state.

In accordance with a third aspect of the present disclosure, the derailleur according to the first or second aspect is configured so that the return value is equal to or smaller than 750.

In the derailleur according to the third aspect, the return value is equal to or smaller than 750. This allows rotational force of the pulley assembly relative to the movable member to be in a preferred state.

In accordance with a fourth aspect of the present disclosure, the derailleur according to any one of the first to third aspects is configured so that the pulley distance ranges from 4.55 centimeters to 15 centimeters.

In the derailleur according to the fourth aspect, the pulley distance ranges from 4.55 centimeters to 15 centimeters. This allows rotational force of the pulley assembly relative to the movable member to be in a preferred state.

In accordance with a fifth aspect of the present disclosure, the derailleur according to any one of the first to third aspects is configured so that the pulley distance ranges from 7 centimeters to 14 centimeters.

In the derailleur according to the fifth aspect, the pulley distance ranges from 7 centimeters to 14 centimeters. This allows rotational force of the pulley assembly relative to the movable member to be in a preferred state.

In accordance with a sixth aspect of the present disclosure, the derailleur according to any one of the first to fifth aspects is configured so that the biasing return force is equal to or larger than 30 newtons.

In the derailleur according to the sixth aspect, the biasing return force is equal to or larger than 30 newtons. This allows rotational force of the pulley assembly relative to the movable member to be in a preferred state.

In accordance with a seventh aspect of the present disclosure, the derailleur according to the sixth aspect is configured so that the biasing return force is equal to or smaller than 50 newtons.

In the derailleur according to the seventh aspect, the biasing return force is equal to or smaller than 50 newtons. This allows rotational force of the pulley assembly relative to the movable member to be in a preferred state.

In accordance with an eighth aspect of the present disclosure, the derailleur according to any one of the first to seventh aspects is configured so that the pulley assembly biasing member includes a first end portion and a second end portion. The first end portion is connected with the movable member. The second end portion is connected with the pulley assembly.

In the derailleur according to the eighth aspect, the pulley assembly biasing member is connected to the movable member and the pulley assembly in a preferred manner.

In accordance with a ninth aspect of the present disclosure, the derailleur according to any one of the first to eighth aspects further comprises a motor configured to move the movable member relative to the base member.

In the derailleur according to the ninth aspect, the motor moves the movable member relative to the base member.

In accordance with a tenth aspect of the present disclosure, the derailleur according to the ninth aspect is configured so that the motor is configured to be supplied with electric power from a battery disposed apart from the derailleur.

In the derailleur according to the tenth aspect, the battery is disposed apart from the derailleur. This limits increases in the size of the derailleur.

In accordance with an eleventh aspect of the present disclosure, the derailleur according to the ninth or tenth aspect further comprises a battery configured to supply the motor with electric power.

The derailleur according to the eleventh aspect is provided with the motor and the battery. This shortens wiring between the motor and the battery.

In accordance with a twelfth aspect of the present disclosure, the derailleur according to any one of the first to eleventh aspects further comprises a wireless unit configured to wirelessly communicate with a human-powered vehicle electric component.

In the derailleur according to the twelfth aspect, the wireless unit is used to wirelessly communicate with the human-powered vehicle electric component.

In accordance with a thirteenth aspect of the present disclosure, the derailleur according to any one of the first to ninth aspects further comprises a battery configured to supply electric power to an assist motor configured to apply propulsion force to a human-powered vehicle.

In the derailleur according to the thirteenth aspect, the assist motor is supplied with electric power from the battery of the derailleur.

In accordance with a fourteenth aspect of the present disclosure, a human-powered vehicle derailleur comprises a base member configured to be attached to a human-powered vehicle frame, a movable member movable with respect to the base member, a pulley assembly pivotally attached to the movable member in a first pivotal direction and in a second pivotal direction opposite to the first pivotal direction, the pulley assembly including a first pulley having a first pulley axis and a second pulley having a second pulley axis, a pulley assembly biasing member configured to bias the pulley assembly with respect to the movable member in the first pivotal direction, a pulley distance (centimeter) being defined between the first pulley axis and the second pulley axis, a biasing tension force (newton) being defined by rotational force of the pulley assembly relative to the movable member, and a tension value defined by the biasing tension force multiplied by the pulley distance. The tension value is equal to or larger than 136.

In the derailleur according to the fourteenth aspect, the tension value is equal to or larger than 136. This allows rotational force of the pulley assembly relative to the movable member to be in a preferred state.

In accordance with a fifteenth aspect of the present disclosure, the derailleur according to the fourteenth aspect is configured so that the tension value is equal to or larger than 300.

In the derailleur according to the fifteenth aspect, the tension value is equal to or larger than 300. This allows rotational force of the pulley assembly relative to the movable member to be in a preferred state.

In accordance with a sixteenth aspect of the present disclosure, the derailleur according to the fourteenth or fifteenth aspect is configured so that the tension value is equal to or smaller than 750.

In the derailleur according to the sixteenth aspect, the tension value is equal to or smaller than 750. This allows rotational force of the pulley assembly relative to the movable member to be in a preferred state.

In accordance with a seventeenth aspect of the present disclosure, the derailleur according to any one of the fourteenth to sixteenth aspects is configured so that the pulley distance ranges from 4.55 centimeters to 15 centimeters.

In the derailleur according to the seventeenth aspect, the pulley distance ranges from 4.55 centimeters to 15 centimeters. This allows rotational force of the pulley assembly relative to the movable member to be in a preferred state.

In accordance with an eighteenth aspect of the present disclosure, the derailleur according to any one of the fourteenth to sixteenth aspects is configured so that the pulley distance ranges from 7 centimeters to 14 centimeters.

In the derailleur according to the eighteenth aspect, the pulley distance ranges from 7 centimeters to 14 centimeters. This allows rotational force of the pulley assembly relative to the movable member to be in a preferred state.

In accordance with a nineteenth aspect of the present disclosure, the derailleur according to any one of the fourteenth to eighteenth aspects is configured so that the biasing tension force is equal to or larger than 30 newtons.

In the derailleur according to the nineteenth aspect, the biasing tension force is equal to or larger than 30 newtons. This allows rotational force of the pulley assembly relative to the movable member to be in a preferred state.

In accordance with a twentieth aspect of the present disclosure, the derailleur according to the nineteenth aspect is configured so that the biasing tension force is equal to or smaller than 50 newtons.

In the derailleur according to the twentieth aspect, the biasing tension force is equal to or smaller than 50 newtons. This allows rotational force of the pulley assembly relative to the movable member to be in a preferred state.

The human-powered vehicle derailleur of the present disclosure sets rotational force of the pulley assembly in a preferred state.

EMBODIMENTS OF THE DISCLOSURE

Embodiment

Figure 1:
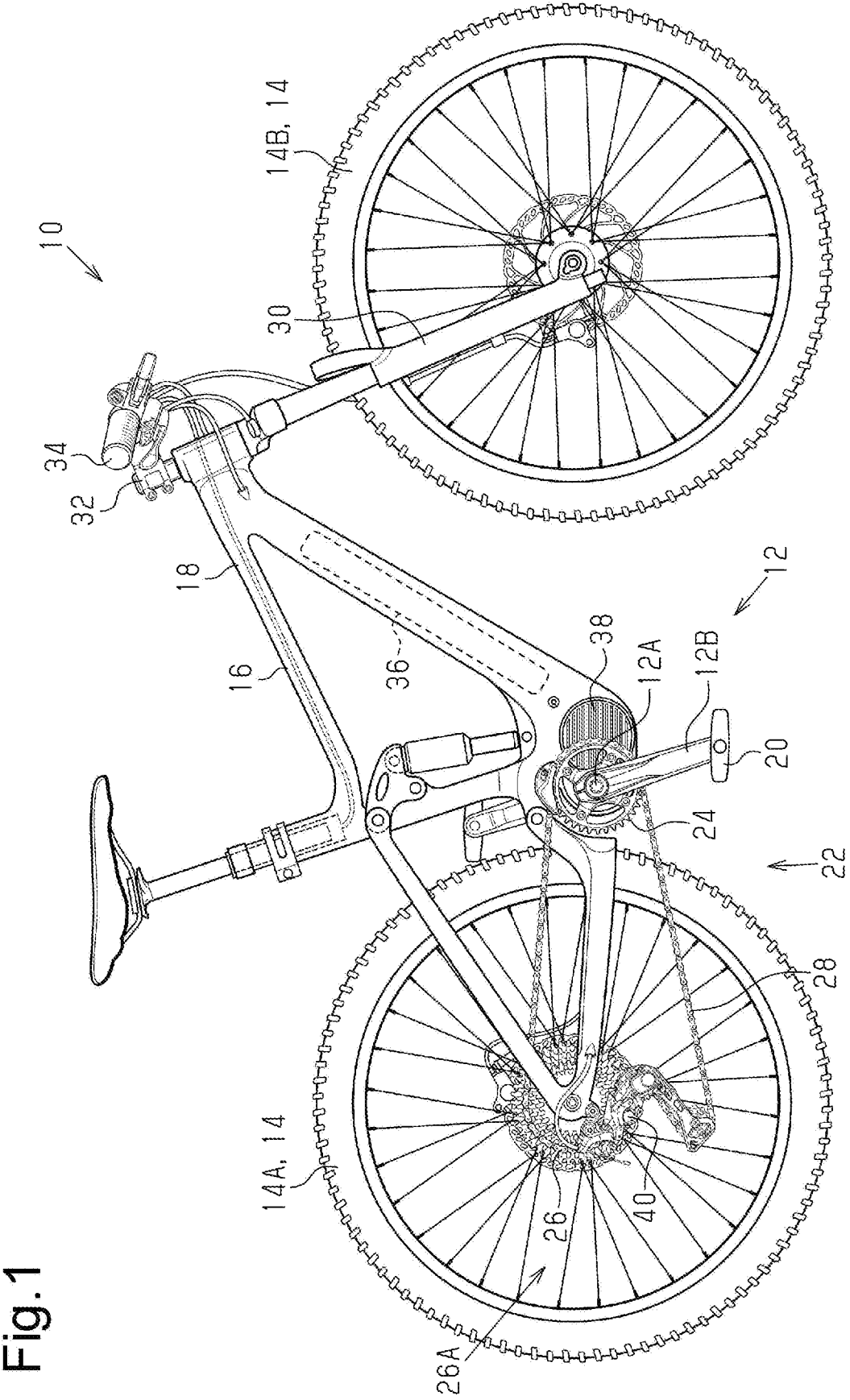
FIG. 1 is a side view of a human-powered vehicle including an embodiment of a human-powered vehicle derailleur.
Figure 2:
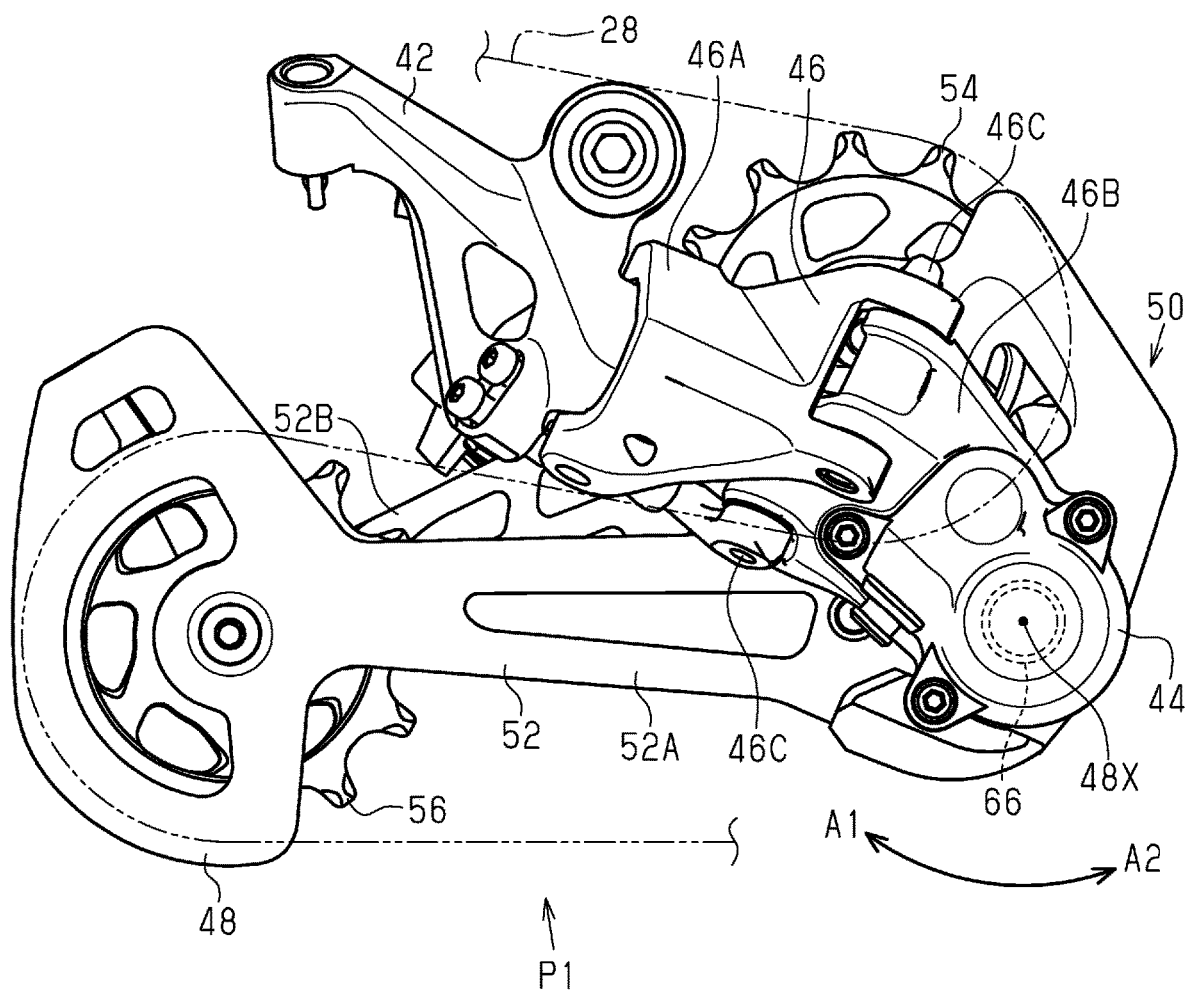
FIG. 2 is a perspective view showing a state in which a pulley assembly of the human-powered vehicle derailleur of the embodiment is in a first pivotal position.
Figure 3:
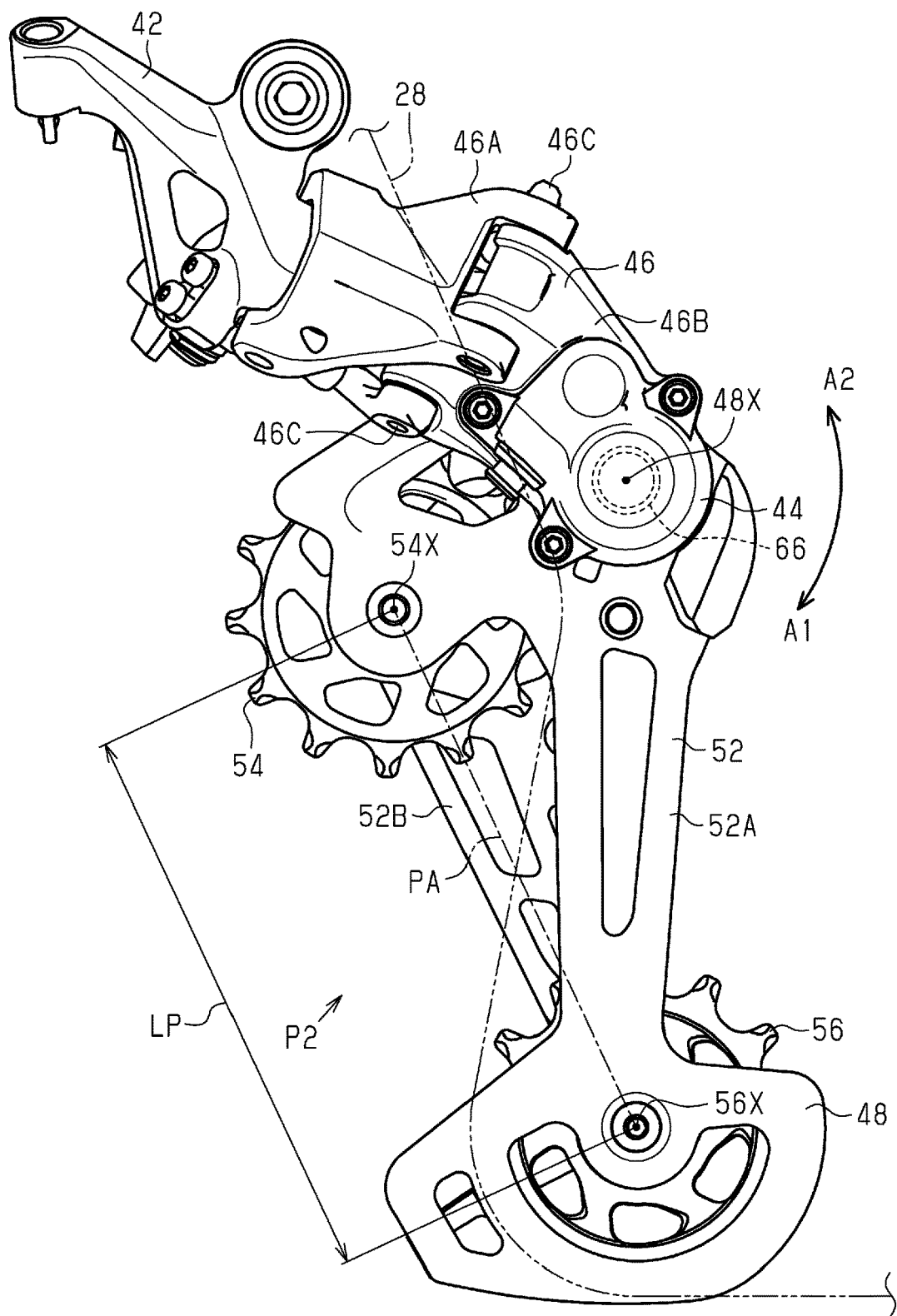
FIG. 3 is a perspective view showing a state in which the pulley assembly of the human-powered vehicle derailleur of the embodiment is in a second pivotal position.

An embodiment of a human-powered vehicle derailleur 40 will now be described with reference to FIGS. 1 to 18. A human-powered vehicle 10 is a vehicle that can be driven by at least human driving force. The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, and a recumbent bike. The bicycle can be an electric bicycle (E-bike). The electric bicycle includes an electric assist bicycle that assists propulsion of the vehicle with an electric motor. In the embodiment described below, the human-powered vehicle 10 refers to a bicycle.

The human-powered vehicle 10 includes a crank 12, wheels 14, and a vehicle body 16. The wheels 14 include a rear wheel 14A and a front wheel 14B. The vehicle body 16 includes a frame 18. The crank 12 includes a crankshaft 12A configured to rotate relative to the frame 18 and crank arms 12B provided on opposite axial ends of the crankshaft 12A. A pedal 20 is coupled to each of the crank arms 12B. The rear wheel 14A is driven in accordance with rotation of the crank 12. The rear wheel 14A is supported by the frame 18. The crank 12 and the rear wheel 14A are coupled by a drive mechanism 22. The drive mechanism 22 includes a front sprocket 24 coupled to the crankshaft 12A. The crankshaft 12A and the front sprocket 24 can be coupled by a first one-way clutch. The first one-way clutch is configured to allow forward rotation of the front sprocket 24 in a case in which the crank 12 is rotated forward, and prohibit rearward rotation of the front sprocket 24 in a case in which the crank 12 is rotated rearward. The drive mechanism 22 further includes a rear sprocket 26 and a chain 28. The chain 28 transmits rotational force of the front sprocket 24 to the rear sprocket 26. The drive mechanism 22 includes multiple rear sprockets 26. The rear sprockets 26 configure a rear sprocket assembly 26A.

The rear sprockets 26 are coupled to the rear wheel 14A. Preferably, a second one-way clutch is provided between the rear sprockets 26 and the rear wheel 14A. The second one-way clutch is configured to allow forward rotation of the rear wheel 14A in a case in which the rear sprockets 26 are rotated forward, and prohibit rearward rotation of the rear wheel 14A in a case in which the rear sprockets 26 are rotated rearward.

The front wheel 14B is attached to the frame 18 by a front fork 30. A handlebar 34 is coupled to the front fork 30 by a stem 32. In the present embodiment, the rear wheel 14A is coupled to the crank 12 by the drive mechanism 22. However, at least one of the rear wheel 14A and the front wheel 14B can be coupled to the crank 12 by the drive mechanism 22.

The human-powered vehicle 10 can include a battery 36 for a human-powered vehicle. The battery 36 includes one or more battery elements. The battery elements include a rechargeable battery. The battery 36 supplies electric power to an assist motor 38. Preferably, the assist motor 38 is connected to a controller to perform wired or wireless communication with the controller. The assist motor 38 is configured to perform, for example, power line communication (PLC) with the controller.

The human-powered vehicle 10 can include the assist motor 38 that applies propulsion force to the human-powered vehicle 10. The assist motor 38 includes one or more electric motors. The assist motor 38 is configured to transmit rotation to at least one of the front wheel 14B and a power transmission path that extends from the pedals 20 to the rear wheel 14A. The power transmission path extending from the pedals 20 to the rear wheel 14A includes the rear wheel 14A. In the present embodiment, the assist motor 38 is provided on the frame 18 of the human-powered vehicle 10 and is configured to transmit rotation to the sprocket 24. A drive unit is configured to include the assist motor 38 and a housing on which the assist motor 38 is provided. Preferably, a one-way clutch is provided on the power transmission path between the assist motor 38 and the crankshaft 12A so that in a case in which the crankshaft 12A is rotated in a direction in which the human-powered vehicle 10 travels forward, the rotational force of the crank 12 will not rotate the assist motor 38. In a case in which the assist motor 38 is provided on at least one of the rear wheel 14A and the front wheel 14B, the assist motor 38 can include a hub motor. The assist motor 38 can be omitted from the human-powered vehicle 10.

The human-powered vehicle 10 includes the derailleur 40. The derailleur 40 is configured to change a transmission ratio R, which is the ratio of rotational speed of the rear wheel 14A to rotational speed of the crank 12. In the present embodiment, the derailleur 40 includes a rear derailleur. The derailleur 40 can include a front derailleur. The derailleur 40 moves the chain 28 from one of the rear sprockets 26 to another one of the rear sprockets 26 included in the rear sprocket assembly 26A.

The derailleur 40 includes a base member 42, a movable member 44, a linkage structure 46, and a pulley assembly 48. The pulley assembly 48 includes at least one plate member 52. The pulley assembly 48 is configured to be pivotally movable relative to the movable member 44 so that a rotational angle of the pulley assembly 48 is movable with respect to the movable member 44. The plate member 52 is configured to be pivotally movable relative to the movable member 44 so that a rotational angle of the plate member 52 is movable with respect to the movable member 44. The rotational angle of the plate member 52 with respect to the movable member 44 is defined as a plate rotational angle X.

Figure 8:
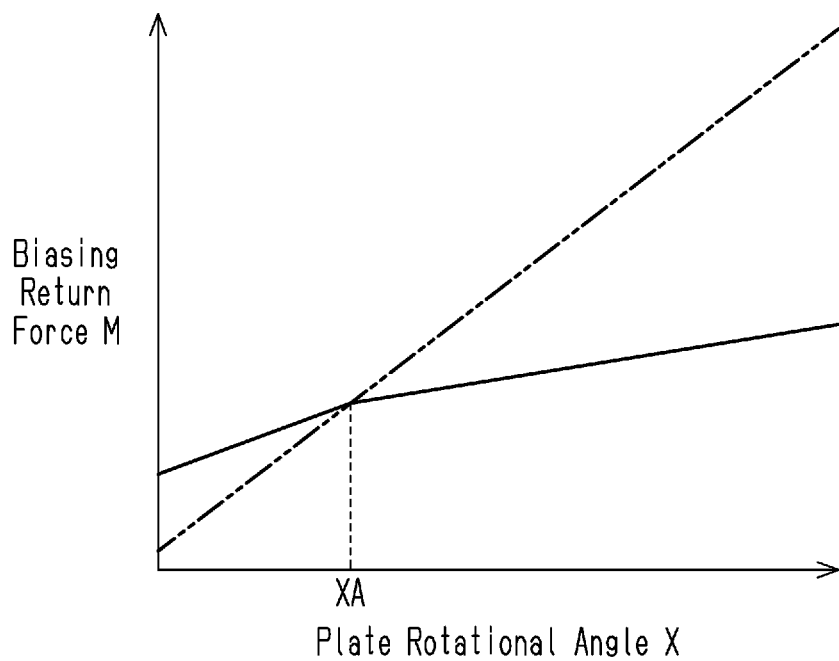
FIG. 8 is a graph showing a relationship between a plate rotational angle and biasing return force.

FIG. 8 shows a relationship between the plate rotational angle X and biasing return force M in a first direction A1.

In a typical derailleur, as shown in FIG. 8 by the double-dashed line, as the plate rotational angle X moves in a second direction, the biasing return force M is linearly increased by a pulley assembly biasing member 66, which attempts to rotate the plate rotational angle X of the pulley assembly 48 with respect to the movable member 44 in the first direction A1. Preferably, in a state in which the plate rotational angle X is a first rotational angle X1, the biasing return force M is less than in a state in which the plate rotational angle X is a second rotational angle X2. In a state in which the plate rotational angle X is the first rotational angle X1, the pulley assembly 48 is located in a first pivotal position P1. In a state in which the plate rotational angle X is the second rotational angle X2, the pulley assembly 48 is located in a second pivotal position P2. The second rotational angle X2 is greater than the first rotational angle X1. Preferably, in a state in which the pulley assembly 48 is located in the second pivotal position P2, the biasing return force M is greater than in a state in which the pulley assembly 48 is located in the first pivotal position P1.

The derailleur 40 includes at least one of a mechanism that increases the biasing return force M in the first pivotal position P1 and an adjustment mechanism that causes the biasing return force M in the second pivotal position P2 to be equal to or smaller than a predetermined torque. The plate rotational angle X corresponds to a rotational amount of the pulley assembly 48 rotating about a pivot axis 48X from the first pivotal position P1 toward the second pivotal position P2. The biasing return force M is defined by rotational force of the pulley assembly 48 relative to the movable member 44.

A first example of the adjustment mechanism is a variable mechanism that varies the relationship between the plate rotational angle X and the biasing return force M in the first direction A1 at a predetermined plate rotational angle XA. The solid line in FIG. 8 shows an example of the relationship between the plate rotational angle X and the biasing return force M of the derailleur 40 using the variable mechanism. The variable mechanism varies the ratio of a change amount of the biasing return force M to a change amount of the plate rotational angle X between a state in which the plate rotational angle X is greater than the plate rotational angle XA and a state in which the plate rotational angle X is equal to or smaller than the plate rotational angle XA. The variable mechanism is configured, for example, so that in a state in which the plate rotational angle X is greater than the plate rotational angle XA, the ratio of the change amount of the biasing return force M to the change amount of the plate rotational angle X is less than in a state in which the plate rotational angle X is equal to or smaller than the plate rotational angle XA. The variable mechanism can be configured not to change the biasing return force M even if the plate rotational angle X is changed in a state in which the plate rotational angle X is greater than the plate rotational angle XA.

A first example of the variable mechanism includes a rotational force control structure 50. The derailleur 40 includes the rotational force control structure 50.

The base member 42 is configured to be attached to the frame 18 of the human-powered vehicle 10. The movable member 44 is movable relative to the base member 42. The linkage structure 46 operatively connects the movable member 44 to the base member 42. The pulley assembly 48 is attached to the movable member 44 to be pivotally movable relative to the movable member 44. The linkage structure 46 includes a first link 46A, second link 46B, and a connecting pin 46C. One end of the first link 46A is swingably attached to the base member 42 by the connecting pin 46C. The other end of the first link 46A is swingably attached to the movable member 44 by the connecting pin 46C. One end of the second link 46B is swingably attached to the base member 42 by the connecting pin 46C. The other end of the second link 46B is swingably attached to the movable member 44 by the connecting pin 46C.

The pulley assembly 48 is pivotally movable relative to the movable member 44 about the pivot axis 48X in the first direction A1 and a second direction A2 opposite to the first direction with respect to the pivot axis 48X. The pulley assembly 48 has the first pivotal position P1 and the second pivotal position P2. The pulley assembly 48 is configured to move in the first direction A1 upon moving from the second pivotal position P2 toward the first pivotal position P1.

The pulley assembly 48 is configured to be in the first pivotal position P1 while the chain 28 of the human-powered vehicle 10 engages with a smallest sprocket 26 of the rear sprocket assembly 26A of the human-powered vehicle 10. The pulley assembly 48 is also configured to be in the second pivotal position P2 while the chain 28 of the human-powered vehicle 10 engages with a largest sprocket 26 of the rear sprocket assembly 26A of the human-powered vehicle 10.

The pulley assembly 48 includes the plate member 52, a first pulley 54 having a first pulley axis 54X, and a second pulley 56 having a second pulley axis 56X. The plate member 52 is pivotally supported by the movable member 44. The first pulley 54 and the second pulley 56 are supported by the plate member 52 and pivotally movable relative to the plate member 52. The first pulley 54 is attached to the plate member 52 at a position closer to the movable member 44 than the second pulley 56. The chain 28 runs on the first pulley 54 and the second pulley 56. The plate member 52 includes a first plate 52A and a second plate 52B. The first pulley 54 and the second pulley 56 are located between the first plate 52A and the second plate 52B.

The derailleur 40 can include a mechanical derailleur that is driven in accordance with operation of a cable. The derailleur 40 can include an electrical derailleur that actuates in accordance with driving of an actuator.

The derailleur 40 includes the pulley assembly biasing member 66 configured to apply rotational force to the pulley assembly 48 in the first direction A1. The pulley assembly biasing member 66 is provided, for example, on the pivot axis 48X. The pulley assembly biasing member 66 can be a coil spring, a plate spring, or a rubber member. Preferably, the pulley assembly biasing member 66 has a first end portion and a second end portion. The first end portion is connected with the movable member 44. The second end portion is connected with the pulley assembly 48.

Rotational force of the pulley assembly 48 is formed by a total force of biasing force of the pulley assembly biasing member 66 and biasing force of the rotational force control structure 50.

The rotational force control structure 50 is configured to control the rotational force of the pulley assembly 48 relative to the movable member 44. The rotational force control structure 50 includes a cam member 60, an abutment member 62, and a biasing member 64. The cam member 60 has a first cam surface 60A. The abutment member 62 is configured to abut the first cam surface 60A. The abutment member 62 is configured to abut the first cam surface 60A by the biasing member 64 so as to apply first additional force F11 to the pulley assembly 48 in the first direction A1 while the pulley assembly 48 is in the first pivotal position P1. The first additional force F11 corresponds to a component of force F1 in the first direction A1. The force F1 is applied from the biasing member 64 to the pulley assembly 48 through the abutment member 62 while the pulley assembly 48 is in the first pivotal position P1. The first cam surface 60A can be a flat surface or a curved surface. Preferably, the cam member 60 is provided on the movable member 44 to move integrally with the movable member 44. The cam member 60 can be formed integrally with the movable member 44. The cam member 60 can be formed separately from the movable member 44 and attached to the movable member 44.

The cam member 60 has a second cam surface 60B. The abutment member 62 is configured to abut the second cam surface 60B by the biasing member 64 so as to apply second additional force F21 to the pulley assembly 48 in the second direction A2 while the pulley assembly 48 is in the second pivotal position P2. The second cam surface 60B can be a flat surface or a curved surface. The cam member 60 has a transit portion 60C between the first cam surface 60A and the second cam surface 60B. The transit portion 60C includes, for example, a projection formed between the first cam surface 60A and the second cam surface 60B. The second additional force F21 corresponds to a component of force F2 in the second direction A2. The force F2 is applied from the biasing member 64 to the pulley assembly 48 through the abutment member 62 while the pulley assembly 48 is in the second pivotal position P2.

Preferably, the rotational force control structure 50 includes the cam member 60, the abutment member 62, and the biasing member 64. The abutment member 62 is configured to abut the cam member 60. The biasing member 64 is configured to bias the abutment member 62. The abutment member 62 is configured to abut the cam member 60 by the biasing member 64 to reduce rotational force of the pulley assembly biasing member 66 while the pulley assembly 48 is in the second pivotal position P2.

Figure 4:
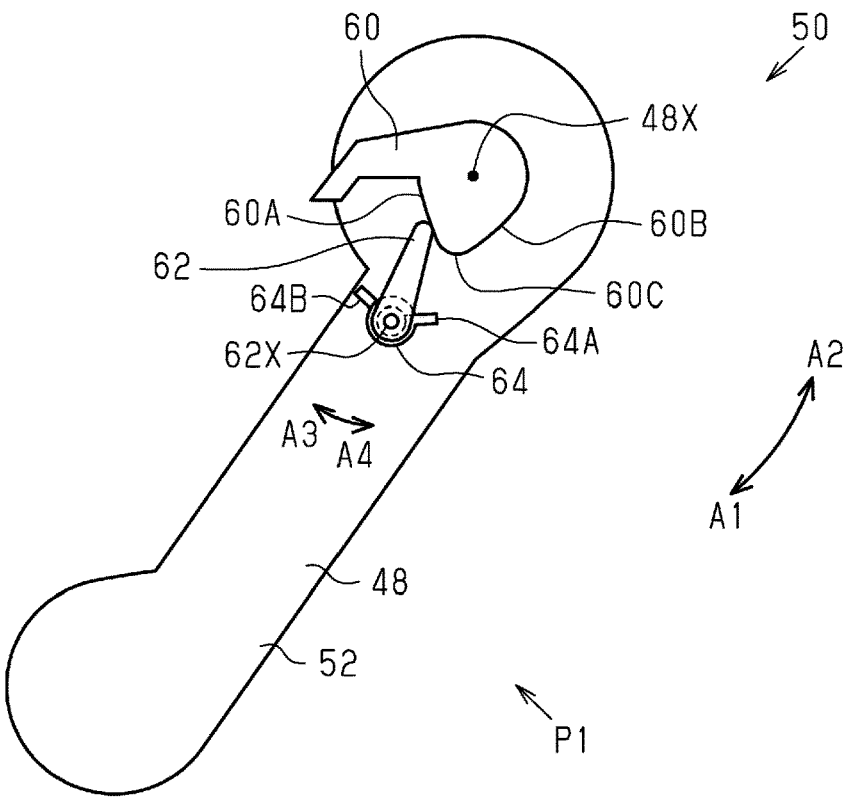
FIG. 4 is a first schematic diagram showing a first example of a rotational force control structure of the human-powered vehicle derailleur shown in FIG. 2.
Figure 5:
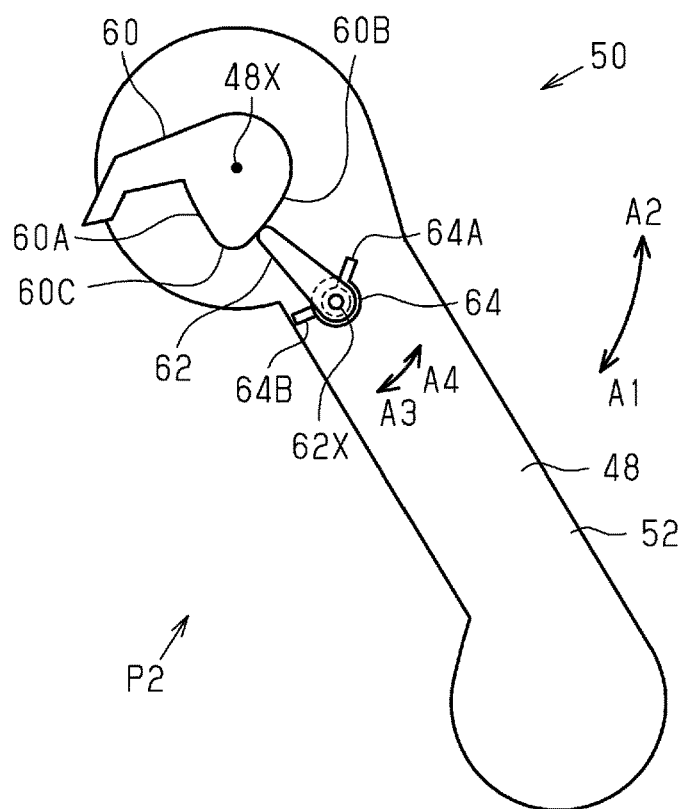
FIG. 5 is a second schematic diagram showing the first example of the rotational force control structure of the human-powered vehicle derailleur shown in FIG. 2.
Figure 6:
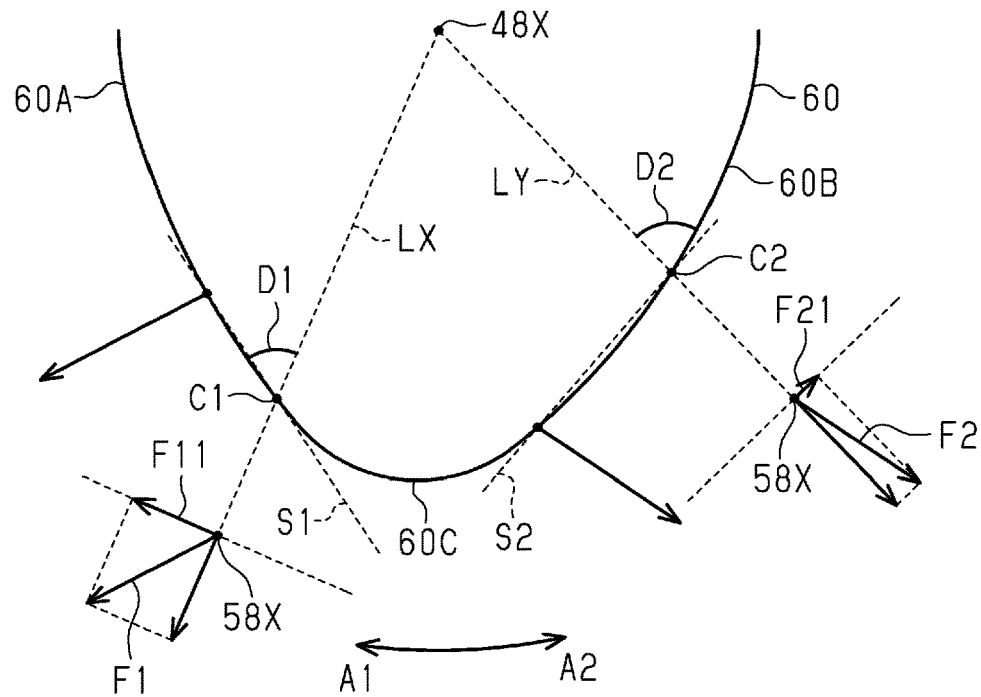
FIG. 6 is a diagram showing a relationship between a cam surface of the first example of the rotational force control structure of the human-powered vehicle derailleur shown in FIG. 2 and first additional force and second additional force.
Figure 7:
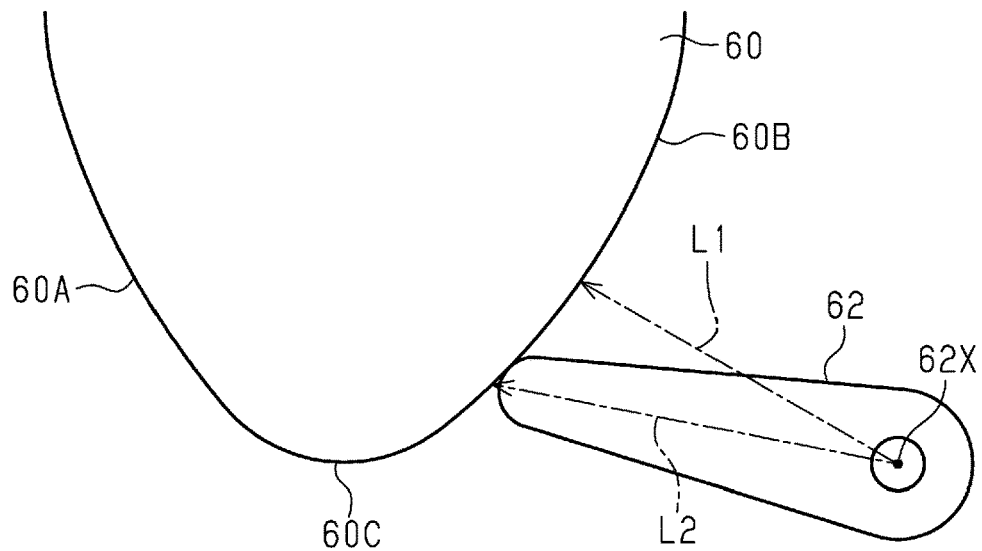
FIG. 7 is a diagram showing a positional relationship between the cam surface and an abutment member of the first example of the rotational force control structure of the human-powered vehicle derailleur shown in FIG. 2.

FIGS. 4 and 5 show a first example of the rotational force control structure 50.

The biasing member 64 has a first end 64A and a second end 64B. The first end 64A is attached to one of the abutment member 62 and the pulley assembly 48. The second end 64B is attached to the other of the abutment member 62 and the pulley assembly 48. The biasing member 64 includes at least one of a coil spring, a plate spring, and an elastic member.

The abutment member 62 has a rotational axis 62X and is rotatable about the rotational axis 62X in a third direction A3 and a fourth direction A4 opposite to the third direction A3. The biasing member 64 is configured to bias the abutment member 62 in the third direction A3 so that the abutment member 62 abuts the first cam surface 60A of the cam member 60. In a case in which the biasing member 64 includes a coil spring, the biasing member 64 can be provided around a shaft connected to the abutment member 62 and the pulley assembly 48. For example, the shaft extends along the rotational axis 62X of the abutment member 62. The shaft can be provided on the pulley assembly 48 or can be provided on the abutment member 62. The biasing member 64 can be, for example, fitted to the shaft, and the first end 64A is attached to the abutment member 62 and the second end 64B is attached to the pulley assembly 48. The abutment member 62 has a distal end provided opposite to the shaft to abut the first cam surface 60A of the cam member 60. The biasing member 64 is configured to bias the abutment member 62 in the third direction A3 so that the distal end of the abutment member 62 abuts the first cam surface 60A of the cam member 60. Preferably, the biasing member 64 is configured not to bias the abutment member 62 in a direction opposite to the third direction A3. The abutment member 62 is attached to the pulley assembly 48 via the shaft and is rotatable relative to the pulley assembly 48.

The biasing member 64 is configured to bias the abutment member 62 in the third direction A3 so that the abutment member 62 abuts each of the first cam surface 60A and the second cam surface 60B of the cam member 60.

A first reference line LX is defined to extend between the pivot axis 48X and the rotational axis 62X while the pulley assembly 48 is in the first pivotal position P1. A first tangential line S1 is defined with respect to the first cam surface 60A at a first intersection C1 of the first cam surface 60A and the first reference line LX. A first apex angle D1 is defined at the first intersection C1 between the first reference line LX and the first tangential line S1. Preferably, the first apex angle D1 is smaller than 90 degrees. The first apex angle D1 is an acute angle and is formed by the first reference line LX and the first tangential line S1. The first apex angle D1 is formed between a portion of the first reference line LX located toward the pivot axis 48X and a portion of the first tangential line S1 located opposite to the transit portion 60C.

A second reference line LY is defined to extend between the pivot axis 48X and the rotational axis 62X while the pulley assembly 48 is in the second pivotal position P2. A second tangential line S2 is defined with respect to the second cam surface 60B at a second intersection C2 of the second cam surface 60B and the second reference line LY. A second apex angle D2 is defined at the second intersection C2 between the second reference line LY and the second tangential line S2. Preferably, the second apex angle D2 is smaller than 90 degrees. Preferably, the first apex angle D1 is smaller than 90 degrees, and the second apex angle D2 is smaller than 90 degrees. The second apex angle D2 is an acute angle and is formed by the second reference line LY and the second tangential line S2. The second apex angle D2 is formed between a portion of the second reference line LY located toward the pivot axis 48X and a portion of the second tangential line S2 located opposite to the transit portion 60C.

Preferably, a first distance L1, which extends from the cam member 60 to the rotational axis 62X of the abutment member 62, is less than a second distance L2, which extends from a contact point of the abutment member 62 with the cam member 60 to the rotational axis 62X of the abutment member 62. The configuration in which the first distance L1 is less the second distance L2 limits separation of the abutment member 62 from the cam member 60.

Figure 9:
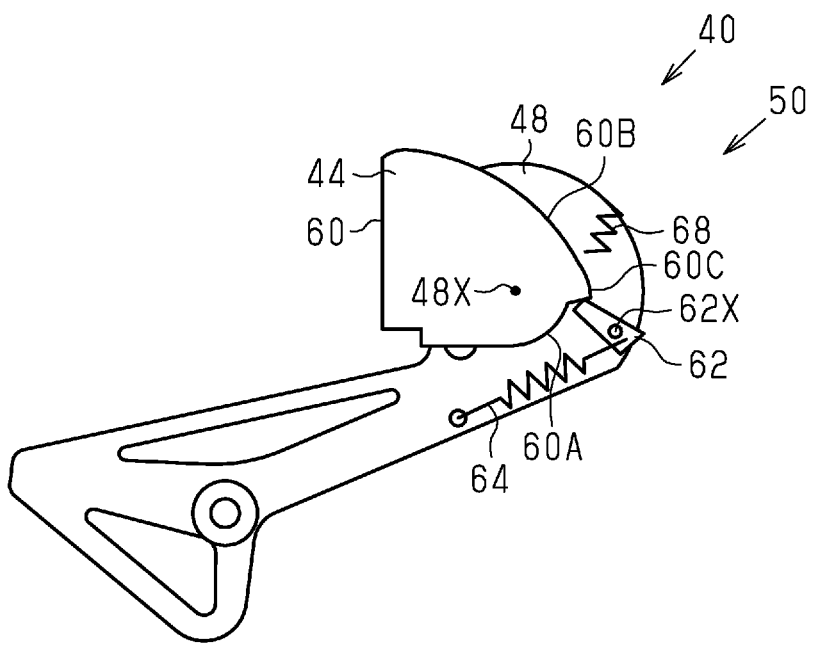
FIG. 9 is a first schematic diagram showing a first modified example of the first example of the rotational force control structure of the human-powered vehicle derailleur shown in FIG. 2.
Figure 10:
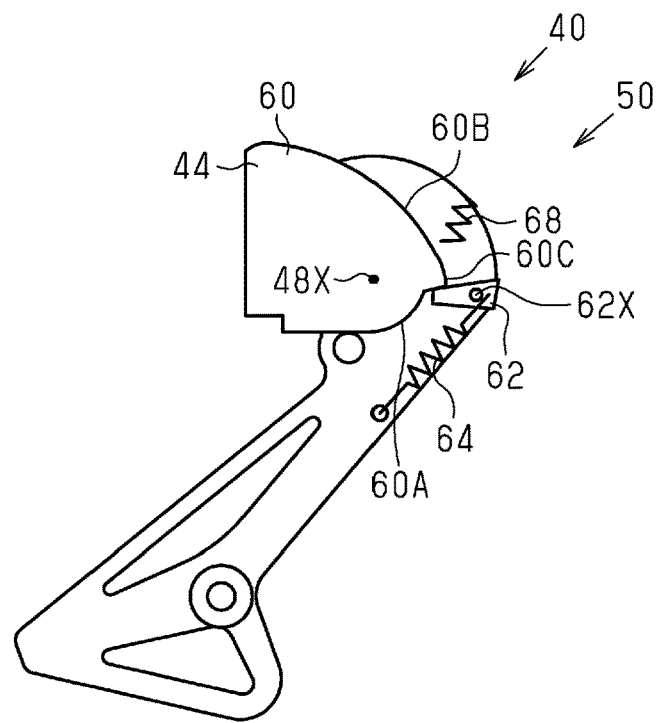
FIG. 10 is a second schematic diagram showing the first modified example of the first example of the rotational force control structure of the human-powered vehicle derailleur shown in FIG. 2.
Figure 11:
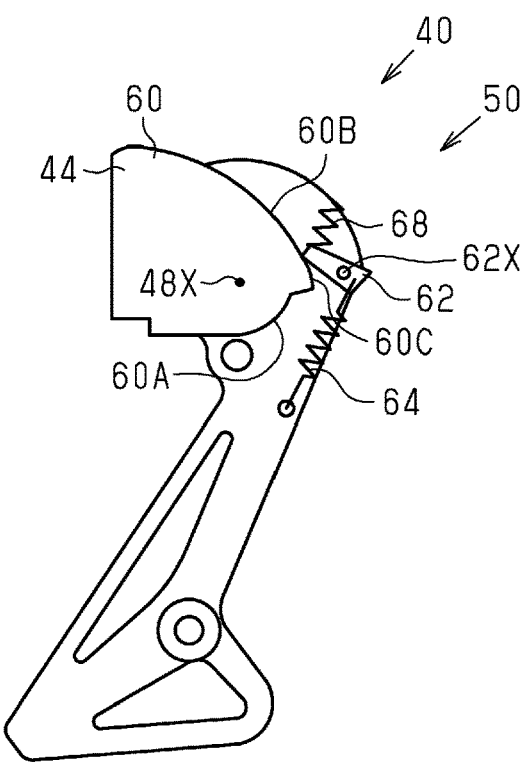
FIG. 11 is a third schematic diagram showing the first modified example of the first example of the rotational force control structure of the human-powered vehicle derailleur shown in FIG. 2.

The first distance L1 can be configured to be equal to or larger than the second distance L2. In this case, as shown in FIGS. 9 to 11, the derailleur 40 can include an auxiliary biasing member 68. While the pulley assembly 48 is in the second pivotal position P2, the auxiliary biasing member 68 is in contact with the abutment member 62 and biases the abutment member 62 so that the abutment member 62 will not separate from the second cam surface 60B.

In the derailleur 40 including the first example of the rotational force control structure 50, while the pulley assembly 48 is in the first pivotal position P1, the pulley assembly 48 is readily rotated in the first direction A1 by the first additional force F11. While the pulley assembly 48 is in the second pivotal position P2, the pulley assembly 48 is readily rotated in the second direction A2 by the second additional force F21. Preferably, the predetermined plate rotational angle XA corresponds to the plate rotational angle X of the pulley assembly 48 in which the abutment member 62 is in contact with the transit portion 60C. While the pulley assembly 48 is in the first pivotal position P1, the biasing return force M is increased, so that the derailleur 40 increases tension of the chain 28. Increased tension of the chain 28 sets rotational force of the pulley assembly 48 relative to the movable member 44 in a preferred state. This limits unintentional shifting. In addition, in a state in which the pulley assembly 48 is in the first pivotal position P1, the first additional force F11 restricts rotation of the pulley assembly in the second direction A2 caused by vibration generated, for example, during travelling.

While the pulley assembly 48 is in the second pivotal position P2, the derailleur 40 limits increases in the biasing return force M. This reduces driving loss of a shifting operation of the derailleur 40 and driving loss caused by friction generated in the chain 28. The derailleur 40 limits decreases in the shifting performance during a shifting operation that moves the chain 28 to another one of the sprockets 26 and also limits decreases in the driving efficiency during rotation of the annular chain 28 extending between the front sprocket 24 and the rear sprockets 26. Thus, rotational force of the pulley assembly 48 relative to the movable member 44 is set in a preferred state. While the pulley assembly 48 is in the second pivotal position P2, the second additional force F21 partially compensates for biasing force of the pulley assembly biasing member 66. This reduces friction generated between plates and chain rollers that configure the chain 28. Hence, decreases in the driving efficiency are limited. For example, if the biasing return force M is increased while the pulley assembly 48 is in the second pivotal position P2, tension of the chain 28 is increased while the pulley assembly 48 is in the second pivotal position P2. This increases friction resistance caused by sliding of the plates and chain rollers of the chain 28. In addition, energy loss is increased. As a result, the driving efficiency is lowered. While the pulley assembly 48 is in the second pivotal position P2, the derailleur 40 limits increases in the biasing return force M. Decreases in the driving efficiency are limited while the pulley assembly 48 is in the second pivotal position P2.

The biasing return force M is adjusted to a value appropriate for, for example, at least one of the material, shape, and size of a biasing member included in the rotational force control structure 50.

Figure 12:
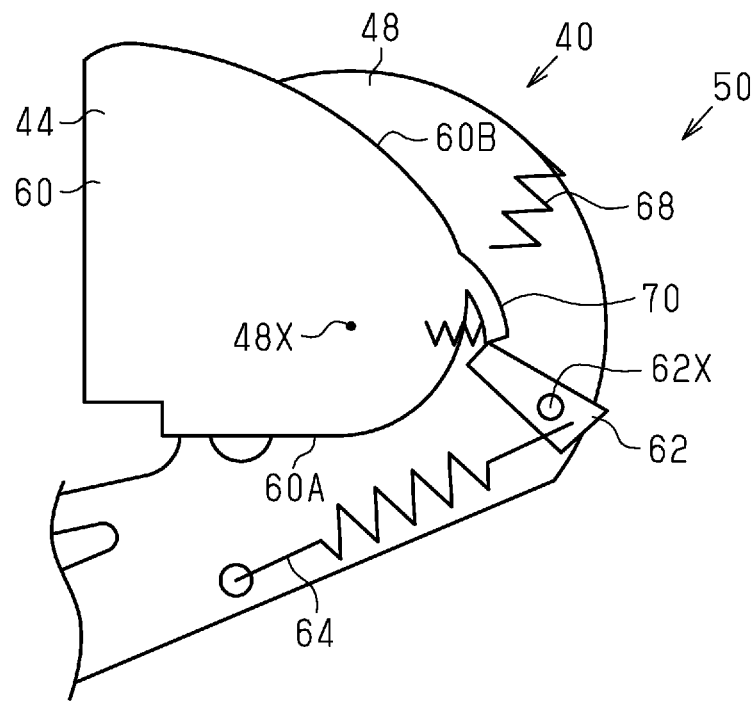
FIG. 12 is a second schematic diagram showing a second modified example of the first example of the rotational force control structure of the human-powered vehicle derailleur shown in FIG. 2.
Figure 13:
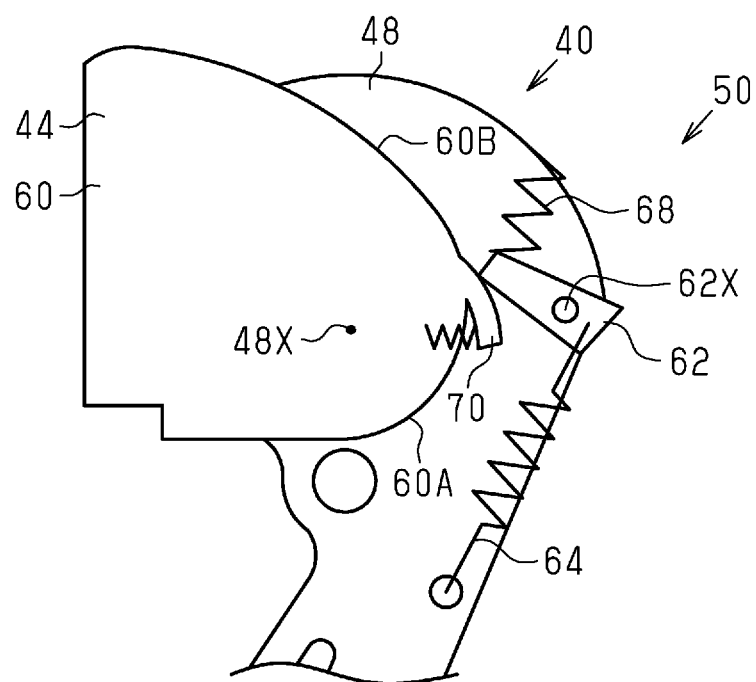
FIG. 13 is a second schematic diagram showing the second modified example of the first example of the rotational force control structure of the human-powered vehicle derailleur shown in FIG. 2.

As shown in FIGS. 12 and 13, in the first example of the rotational force control structure 50, the rotational force control structure 50 can include a resistance applying member 70 that is elastically deformable. In this case, the rotational force control structure 50 is configured to control rotational force of the pulley assembly relative to the movable member. The rotational force control structure 50 includes the resistance applying member 70 and the abutment member 62. The resistance applying member 70 is attached to the movable member 44. The abutment member 62 is attached to the pulley assembly 48 and configured to contact the resistance applying member 70 as the pulley assembly 48 moves in the second direction A2 from the first pivotal position P1 toward the second pivotal position P2. The resistance applying member 70 is elastically deformable. The resistance applying member 70 is extendable toward the abutment member 62. The resistance applying member 70 is configured so that the extension state changes in accordance with a state of contact with the abutment member 62. The resistance applying member 70 can be formed integrally with the movable member 44. The resistance applying member 70 can be formed separately from the movable member 44 and attached to the movable member 44. In a case in which the resistance applying member 70 is formed separately from the movable member 44, the resistance applying member 70 can be biased by biasing force of a biasing member separate from the resistance applying member 70. The resistance applying member 70 is provided on a portion corresponding to the transit portion 60C. While the pulley assembly 48 is in the second pivotal position P2, the derailleur 40 limits increases in the biasing return force M using the resistance applying member 70. This reduces driving loss of shifting operation of the derailleur 40.

Figure 14:
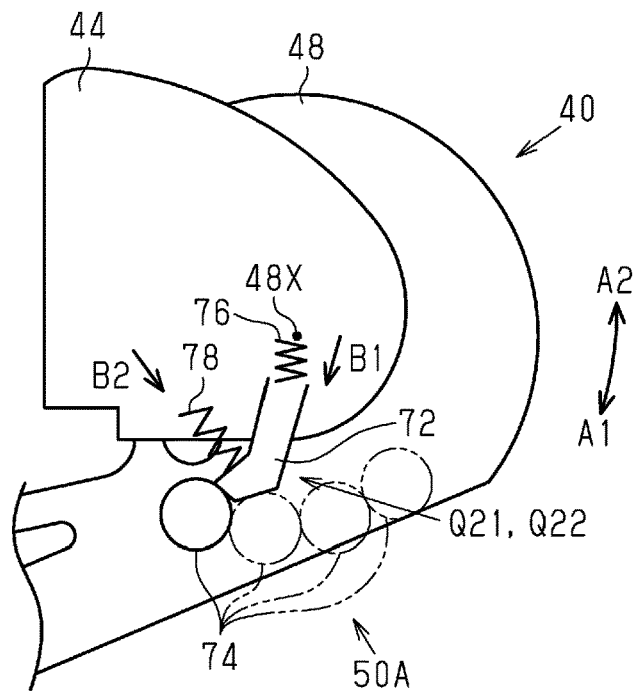
FIG. 14 is a second schematic diagram showing a second example of the rotational force control structure of the human-powered vehicle derailleur shown in FIG. 2.
Figure 15:
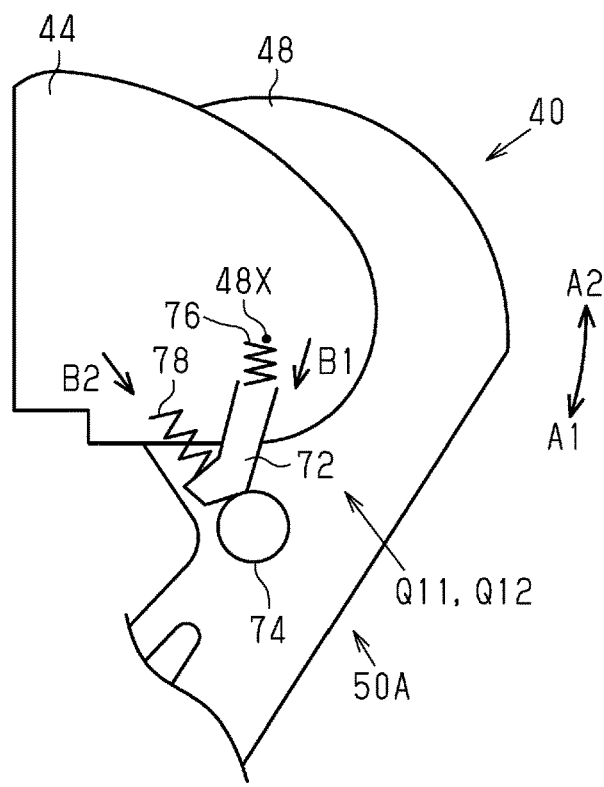
FIG. 15 is a second schematic diagram showing the second example of the rotational force control structure of the human-powered vehicle derailleur shown in FIG. 2.

FIGS. 14 and 15 show a second example of the rotational force control structure 50.

The rotational force control structure 50 shown in FIGS. 14 and 15 is configured to control rotational force of the pulley assembly relative to the movable member. The rotational force control structure 50A includes a resistance applying member 72, a contact member 74, and a first biasing member 76. The resistance applying member 72 is movably attached to the movable member 44. The contact member 74 is attached to the pulley assembly 48 and configured to contact the resistance applying member 72 as the pulley assembly 48 moves in the second direction A2 from the first pivotal position P1 toward the second pivotal position P2. The first biasing member 76 is configured to bias the resistance applying member 72 from a first retracted position Q11 toward a first extended position Q21 in a first biasing direction B1. Preferably, the resistance applying member 72 of the rotational force control structure 50A is configured to contact the pulley assembly 48 by biasing force of one or both of the biasing member 76 and a biasing member 78.

The first biasing member 76 is attached to the movable member 44. The first biasing member 76 can be a coil spring, a plate spring, or a rubber member.

The rotational force control structure 50 further includes a second biasing member 78. The second biasing member 78 is configured to bias the resistance applying member 72 from a second retracted position Q12 toward a second extended position Q22 in a second biasing direction B2 that is different from the first biasing direction B1. As viewed from the pulley assembly 48, the first retracted position Q11 can be different from the second retracted position Q12. Preferably, as viewed from the movable member 44, the first retracted position Q11 is the same as the second retracted position Q12. As viewed from the pulley assembly 48, the first extended position Q21 can be different from the second extended position Q22. Preferably, as viewed from the movable member 44, the first extended position Q21 is the same as the second extended position Q22.

The second biasing member 78 is attached to the movable member 44. The second biasing member 78 can be a coil spring, a plate spring, or a rubber member. While the pulley assembly 48 is in the second pivotal position P2, the second biasing member 78 biases the resistance applying member 72 so that the resistance applying member 72 is contactable with the contact member 74. The second biasing member 78 is configured to bias the resistance applying member 72 in the second biasing direction B2 using the contact member 74 while the pulley assembly 48 is in the second pivotal position P2.

Preferably, the contact member 74 is configured to pass through the resistance applying member 72 by moving the resistance applying member 72 toward the first retracted position Q11 as the pulley assembly 48 moves in the second direction A2 from the first pivotal position P1 toward the second pivotal position P2. Preferably, the contact member 74 is configured to pass through the resistance applying member 72 by moving the resistance applying member 72 toward the first retracted position Q11 and the second retracted position Q12 as the pulley assembly 48 moves in the second direction A2 from the first pivotal position P1 toward the second pivotal position P2.

In the derailleur 40 having the second example of the rotational force control structure 50, during rotation of the pulley assembly 48 from the first pivotal position P1 to the second pivotal position P2, the first biasing member 76 is compressed to apply force that pushes the resistance applying member 72 onto the contact member 74. This increases friction force generated between the resistance applying member 72 and the contact member 74 and hinders movement of the pulley assembly 48 in the first direction A1. As a result, increases in the biasing return force M are limited, thereby reducing loss of driving power of the derailleur 40 during a shifting operation and loss of driving power caused by friction generated in the chain. In the derailleur 40 having the second example of the rotational force control structure 50, during rotation of the pulley assembly 48, contact of the resistance applying member 72 with the contact member 74 resists movement of the pulley assembly 48. This compensates for biasing force of the pulley assembly biasing member 66 during movement of the pulley assembly 48 in the first direction A1 and the second direction A2.

A second example of the variable mechanism includes a biasing member 80 that applies biasing force to the pulley assembly 48. The biasing member 80 corresponds to the pulley assembly biasing member 66 of the derailleur 40. A derailleur 40A includes a base member 42, a movable member 44, a pulley assembly 48, and the biasing member 80. The base member 42 is configured to be attached to the frame 18 of the human-powered vehicle 10. The movable member 44 is movable relative to the base member 42. The pulley assembly 48 is configured to be attached to the movable member 44 and rotatable about the pivot axis 48X. The biasing member 80 includes a first biasing member 82 and a second biasing member 84 that apply biasing force to the pulley assembly 48.

The first biasing member 82 has a first spring rate K1. The second biasing member 84 has a second spring rate K2. Preferably, the first spring rate K1 is different from the second spring rate K2. Preferably, the second spring rate K2 is less than the first spring rate K1. The second spring rate K2 can be equal to or larger than the first spring rate K1.

Preferably, the first biasing member 82 and the second biasing member 84 are configured to engage with each other. The second biasing member 84 can be configured not to directly contact the first biasing member 82 and can indirectly bias the first biasing member 82 using another member.

Preferably, one of the first biasing member 82 and the second biasing member 84 is connected to the pulley assembly 48, and the other of the first biasing member 82 and the second biasing member 84 is connected to the movable member 44. The first biasing member 82 has a first end portion 82X and a second end portion 82Y. The second biasing member 84 has a third end portion 84X and a fourth end portion 84Y.

The first biasing member 82 is connected to the second biasing member 84 at portions excluding the first end portion 82X and the fourth end portion 84Y. The first end portion 82X of the first biasing member 82 is connected to the movable member 44. The second end portion 82Y of the first biasing member 82 is connected to the third end portion 84X of the second biasing member 84. The fourth end portion 84Y of the second biasing member 84 can be connected to the pulley assembly 48. The first end portion 82X of the first biasing member 82 corresponds to the first end portion of the pulley assembly biasing member 66. The fourth end portion 84Y of the second biasing member 84 corresponds to the second end portion of the pulley assembly biasing member 66.

The first biasing member 82 can be made of a first material, and the second biasing member 84 can be made of a second material that is different from the first material. The first biasing member 82 can be made of the first material, and the second biasing member 84 can be made of the first material. The first biasing member 82 can have a first cross-sectional area, and the second biasing member 84 can have a second cross-sectional area that is different from the first cross-sectional area. The first biasing member 82 can have the first cross-sectional area, and the second biasing member 84 can have the first cross-sectional area.

Figure 16:
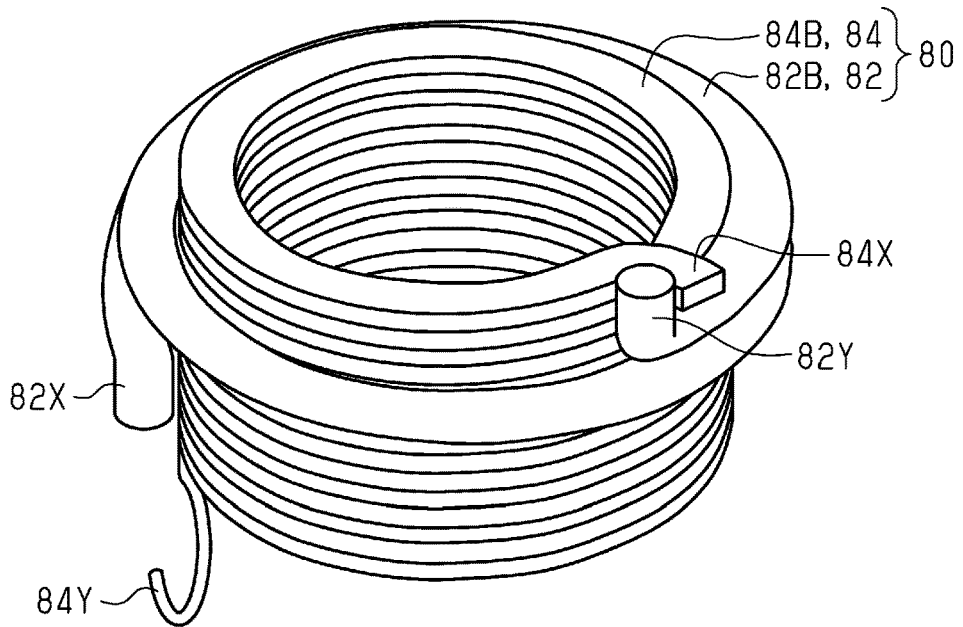
FIG. 16 is a perspective view showing a first example of a pulley assembly biasing member of the human-powered vehicle derailleur shown in FIG. 2.

FIG. 16 shows a first example in which the first biasing member 82 and the second biasing member 84 are both coil springs. In a case in which the first biasing member 82 and the second biasing member 84 are coil springs, the first biasing member 82 has a first coiling diameter, and the second biasing member 84 has a second coiling diameter that is different from the first coiling diameter. Preferably, the second coiling diameter of the second biasing member 84 is smaller than the first coiling diameter of the first biasing member 82. In a case in which the first biasing member 82 and the second biasing member 84 are coil springs, the first biasing member 82 and the second biasing member 84 can be different in at least one of the numbers of turns in coil springs, the average coil diameter, the coil diameter, and the material so that the first spring rate K1 is different from the second spring rate K2.

The first biasing member 82 has a first coil center axis. The second biasing member 84 has a second coil center axis that coincides with the first coil center axis to form a coil center axis. Preferably, the second biasing member 84 is disposed radially inward from the first biasing member 82 with respect to the coil center axis. At least part of the first biasing member 82 is located in the second biasing member 84. Preferably, the first coil center axis and the second coil center axis substantially coincide with the pivot axis 48X.

In the first example shown in FIG. 16, the number of turns in the coil spring of the first biasing member 82B is less than the number of turns in the coil spring of the second biasing member 84B. Preferably, the third end portion 84X of the second biasing member 84B projects radially outward from the coil center axis, and the second end portion 82Y of the first biasing member 82B projects along the coil center axis. The third end portion 84X of the second biasing member 84B and the second end portion 82Y of the first biasing member 82B are provided in positions contactable with each other. For example, the first biasing member 82B includes a biasing member having nonlinear characteristics. In an example of a biasing member having nonlinear characteristics, while the pulley assembly 48 is in the first pivotal position P1, the third end portion 84X of the second biasing member 84B is in contact with the second end portion 82Y of the first biasing member 82 and receives first biasing force from the first biasing member 82. While the pulley assembly 48 is in the second pivotal position P2, the first biasing force received from the first biasing member 82 is increased as compared to while the pulley assembly 48 is in the first pivotal position P1. This reduces the biasing return force M in the entirety of the biasing member 80.

Figure 17:
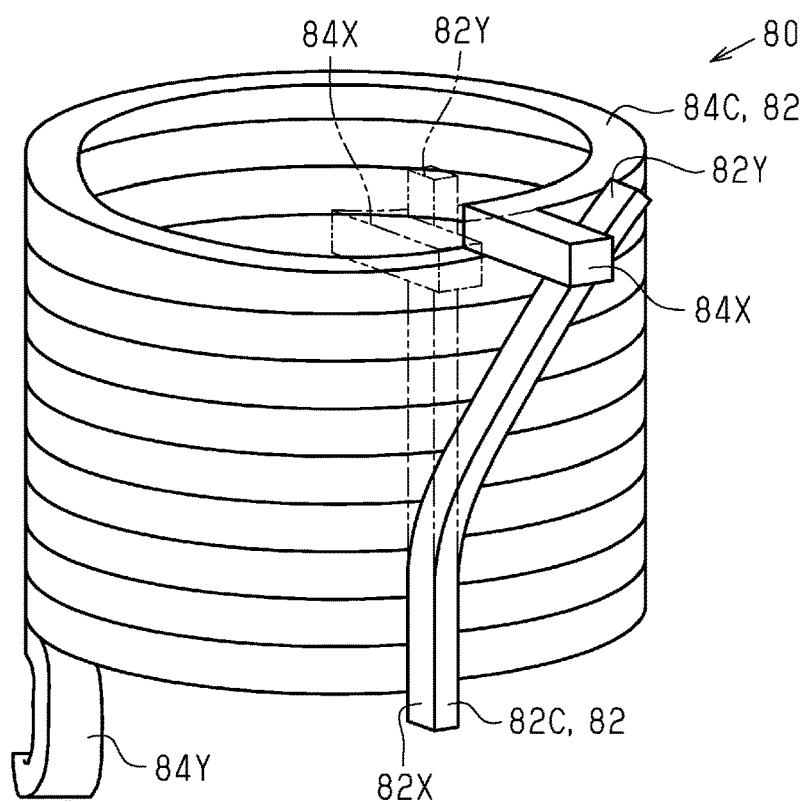
FIG. 17 is a perspective view showing a second example of a pulley assembly biasing member of the human-powered vehicle derailleur shown in FIG. 2.

FIG. 17 shows a second example in which one of the first biasing member 82 and the second biasing member 84 is a coil spring, and the other of the first biasing member 82 and the second biasing member 84 is a plate spring. For example, the second biasing member 84C is a coil spring, and the first biasing member 82C is a plate spring. The first biasing member 82C is provided in a direction in which the coil spring of the second biasing member 84C extends. The fourth end portion 84Y of the second biasing member 84C projects radially outward from the coil center axis. While the pulley assembly 48 is in the first pivotal position P1, the fourth end portion 84Y of the second biasing member 84C is in contact with the first end portion 82X of the first biasing member 82C. While the pulley assembly 48 is in the first pivotal position P1, the elastic deformation amount of the first biasing member 82C is less than while the pulley assembly 48 is in the second pivotal position P2. While the pulley assembly 48 is in the second pivotal position P2, the elastic deformation amount of the first biasing member 82C is greater than while the pulley assembly 48 is in the first pivotal position P1. Therefore, while the pulley assembly 48 is in the second pivotal position P2, the deformation amount of each of the first biasing member 82C and the second biasing member 84C is less than the deformation amount of the pulley assembly biasing member 66 in a case in which the pulley assembly biasing member 66 is provided. Therefore, a total force of the biasing return force M of the first biasing member 82C and the second biasing member 84C is less than the biasing return force M of the pulley assembly biasing member 66. This reduces the biasing return force M in the entirety of the biasing member 80.

Figure 18:
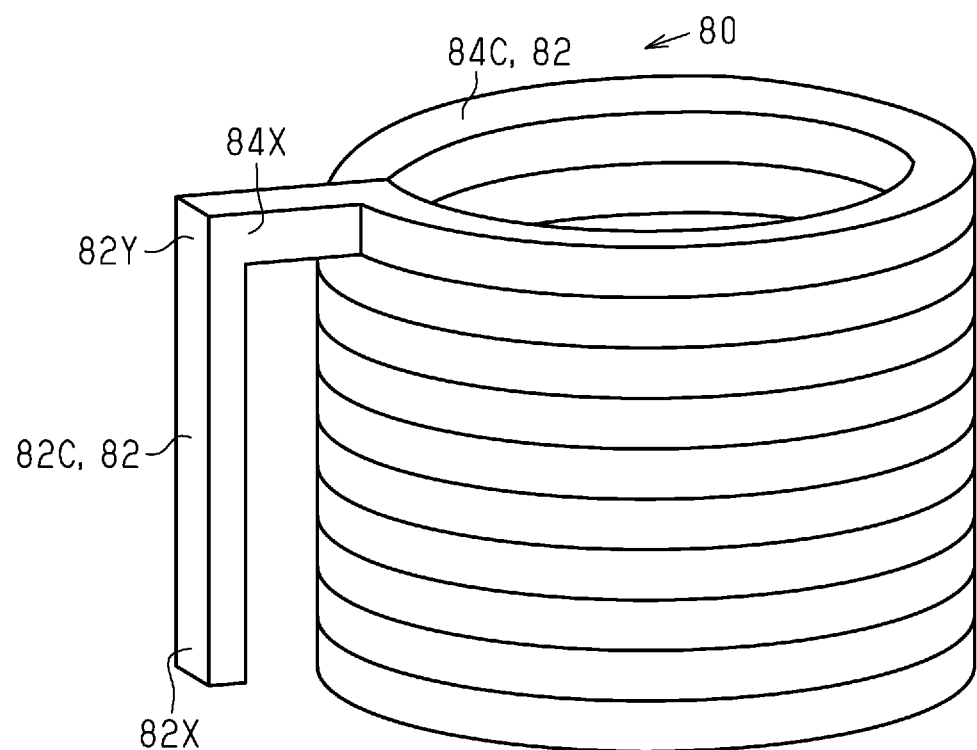
FIG. 18 is a perspective view showing a modified example of the pulley assembly biasing member shown in FIG. 17.

As shown in FIG. 18, the first biasing member 82C and the second biasing member 84C can be formed integrally. In this case, in the same manner as the second example shown in FIG. 17, while the pulley assembly 48 is in the first pivotal position P1, the total elastic deformation amount of the elastic deformation amount of the first biasing member 82C and the elastic deformation amount of the second biasing member 84C is less than while the pulley assembly 48 is in the second pivotal position P2. While the pulley assembly 48 is in the second pivotal position P2, both the first biasing member 82C and the second biasing member 84C elastically deform. This reduces the biasing return force M in the entirety of the biasing member 80. Thus, the pulley assembly 48 appropriately controls the biasing return force.

In a second example of the adjustment mechanism, a pulley assembly biasing member 66 is configured so that at least one of the biasing return force M and biasing tension force N in the second pivotal position P2 sets rotational force of the pulley assembly 48 relative to the movable member 44 in a preferred state.

The derailleur 40 includes a base member 42, a movable member 44, a pulley assembly 48, and the pulley assembly biasing member 66. The base member 42 is configured to be attached to the frame 18 of the human-powered vehicle 10. The movable member 44 is movable relative to the base member 42. The pulley assembly 48 is attached to the movable member 44 and rotatable in the first direction A1 and the second direction A2 opposite to the first direction A1. The pulley assembly 48 includes a first pulley 54 having a first pulley axis 54X and a second pulley 56 having a second pulley axis 56X. The pulley assembly biasing member 66 is configured to bias the pulley assembly 48 with respect to the movable member 44 in the first direction A1.

In a first example of the second example of the adjustment mechanism, the derailleur 40 has a pulley distance LP (centimeter), biasing return force F (newton), and a return value K. The pulley distance LP is defined between the first pulley axis 54X and the second pulley axis 56X. The biasing return force M is defined by rotational force of the pulley assembly 48 relative to the movable member 44. The return value K is defined by the biasing return force M multiplied by the pulley distance LP.

Measurement Process of Biasing Return Force M

The biasing return force M is measured by a first step, a second step, a third step, and a fourth step. The second step can be executed before the first step or simultaneously with the first step. The third step is executed after the first step and the second step. The fourth step is executed after the third step.

The first step includes fixing the base member 42 of the derailleur 40 to a measurement device and rotating the pulley assembly 48 relative to the movable member 44 so that a line PA connecting the first pulley axis 54X of the first pulley 54 and the second pulley axis 56X of the second pulley 56 is parallel to the connecting pin 46C of the linkage structure 46 on a projection plane orthogonal to the pivot axis 48X. The base member 42 is fixed to the measurement device in the same manner as the base member 42 is fixed to the frame 18.

The second step includes setting a tension gauge to a predetermined hook position. The predetermined hook position is the position of a shaft member used to attach the second pulley 56 to the plate member 52.

The third step includes pulling the pulley assembly 48 using the tension gauge in a direction that is orthogonal to the connecting pin 46C in which the second pulley 56 moves away from the base member 42 on a projection plane orthogonal to the pivot axis 48X. In the third step, on the projection plane orthogonal to the pivot axis 48X, the position of the pulley assembly 48 is held in a position so that the line PA is parallel to the connecting pin 46C of the linkage structure 46.

The fourth step includes attenuating force applied to the tension gauge and measuring torque at which the pulley assembly 48 starts to move in the first direction A1. The torque measured in the fourth step is the biasing return force M.

The return value K is equal to or larger than 136. Preferably, the return value K is equal to or larger than 300. Preferably, the return value K is equal to or smaller than 750.

The steps of measuring the biasing return force M can be changed as follows.

In the first step, the movable member 44 of the derailleur 40 can be fixed to a measurement device. Both the base member 42 and the movable member 44 of the derailleur 40 can be fixed to a measurement device. In a case in which the movable member 44 is fixed to a measurement device, the measurement device includes, for example, a clamp and the clamp is used to fix the movable member 44 to the measurement device.

The first step can include rotating the pulley assembly 48 relative to the movable member 44 so that the line PA is parallel to the connecting pin 46C of the linkage structure 46 as viewed in a direction orthogonal to the extension direction of the first plate 52A.

In the second step, the predetermined hook position can be concentric with the second pulley axis 56X of the second pulley 56.

The third step can include pulling the pulley assembly 48 using a tension gauge in a direction that is orthogonal to the connecting pin 46C in a direction in which the second pulley 56 separates away from the base member 42 as viewed in a direction orthogonal to the extension direction of the first plate 52A.

In a first example of the second example of the adjustment mechanism, preferably, the pulley distance LP ranges from 4.55 centimeters to 15 centimeters. More preferably, the pulley distance LP ranges from 7 centimeters to 14 centimeters.

In the first example of the second example of the adjustment mechanism, preferably, the biasing return force M is equal to or larger than 30 newtons. Preferably, the biasing return force is equal to or smaller than 50 newtons.

In a second example of the second example of the adjustment mechanism, the derailleur 40 has the pulley distance LP (centimeter), the biasing tension force N (newton), and a tension value S. The biasing tension force N is defined by rotational force of the pulley assembly 48 relative to the movable member 44. The tension value S is defined by the biasing tension force N multiplied by the pulley distance LP.

Measurement Process of Biasing Tension Force N

The biasing tension force N is measured by a fifth step, a sixth step, a seventh step, and an eighth step. The sixth step can be executed before the fifth step or simultaneously with the fifth step. The seventh step is executed after the fifth step and the sixth step. The eighth step is executed after the seventh step.

The fifth step is executed in the same manner as the first step in the measurement process of the biasing return force M.

The sixth step is executed in the same manner as the second step in the measurement process of the biasing return force M.

The seventh step is executed in the same manner as the third step in the measurement process of the biasing return force M.

The eighth step includes measuring the maximum force using a tension gauge during 20-millimeter movement of the second pulley 56 away from the base member 42 in a direction orthogonal to the connecting pin 46C. The maximum force measured in the eighth step is the biasing tension force N.

The steps of measuring the biasing tension force N can be changed as follows.

In the fifth step, the movable member 44 of the derailleur 40 can be fixed to a measurement device. Both the base member 42 and the movable member 44 of the derailleur 40 can be fixed to a measurement device. In a case in which the movable member 44 is fixed to a measurement device, the measurement device includes, for example, a clamp and the clamp is used to fix the movable member 44 to the measurement device.

The fifth step can include rotating the pulley assembly 48 relative to the movable member 44 so that the line PA is parallel to the connecting pin 46C of the linkage structure 46 as viewed in a direction orthogonal to the extension direction of the first plate 52A.

In the sixth step, the predetermined hook position can be concentric with the second pulley axis 56X of the second pulley 56.

The seventh step can include pulling the pulley assembly 48 using a tension gauge in a direction that is orthogonal to the connecting pin 46C in a direction in which the second pulley 56 separates away from the base member 42 as viewed in a direction orthogonal to the extension direction of the first plate 52A.

The tension value S is equal to or larger than 136. Preferably, the tension value S is equal to or larger than 300. Preferably, the tension value S is equal to or smaller than 750.

In the second example of the second example of the adjustment mechanism, preferably, the pulley distance LP ranges from 4.55 centimeters to 15 centimeters. More preferably, the pulley distance LP ranges from 7 centimeters to 14 centimeters.

In the second example of the second example of the adjustment mechanism, preferably, the biasing tension force N is equal to or larger than 30 newtons. More preferably, the biasing tension force N is equal to or smaller than 50.

Only one of the first example of the adjustment mechanism, a modified example of the first example of the adjustment mechanism, the second example of the adjustment mechanism, and a modified example of the second example of the adjustment mechanism can be used to set rotational force of the pulley assembly 48 relative to the movable member 44 in a preferred state. At least two of the first example of the adjustment mechanism, a modified example of the first example of the adjustment mechanism, the second example of the adjustment mechanism, and a modified example of the second example of the adjustment mechanism can be combined and used.

Modified Examples

The description related to the above embodiment exemplifies, without any intention to limit, applicable forms of a human-powered vehicle derailleur according to the present disclosure. The human-powered vehicle derailleur according to the present disclosure can be applied to, for example, modified examples of the embodiment that are described below and combinations of at least two of the modified examples that do not contradict each other. In the following modified examples, the same reference characters are given to those elements that are the same as the corresponding elements of the above embodiment. Such elements will not be described in detail.

Figure 19:
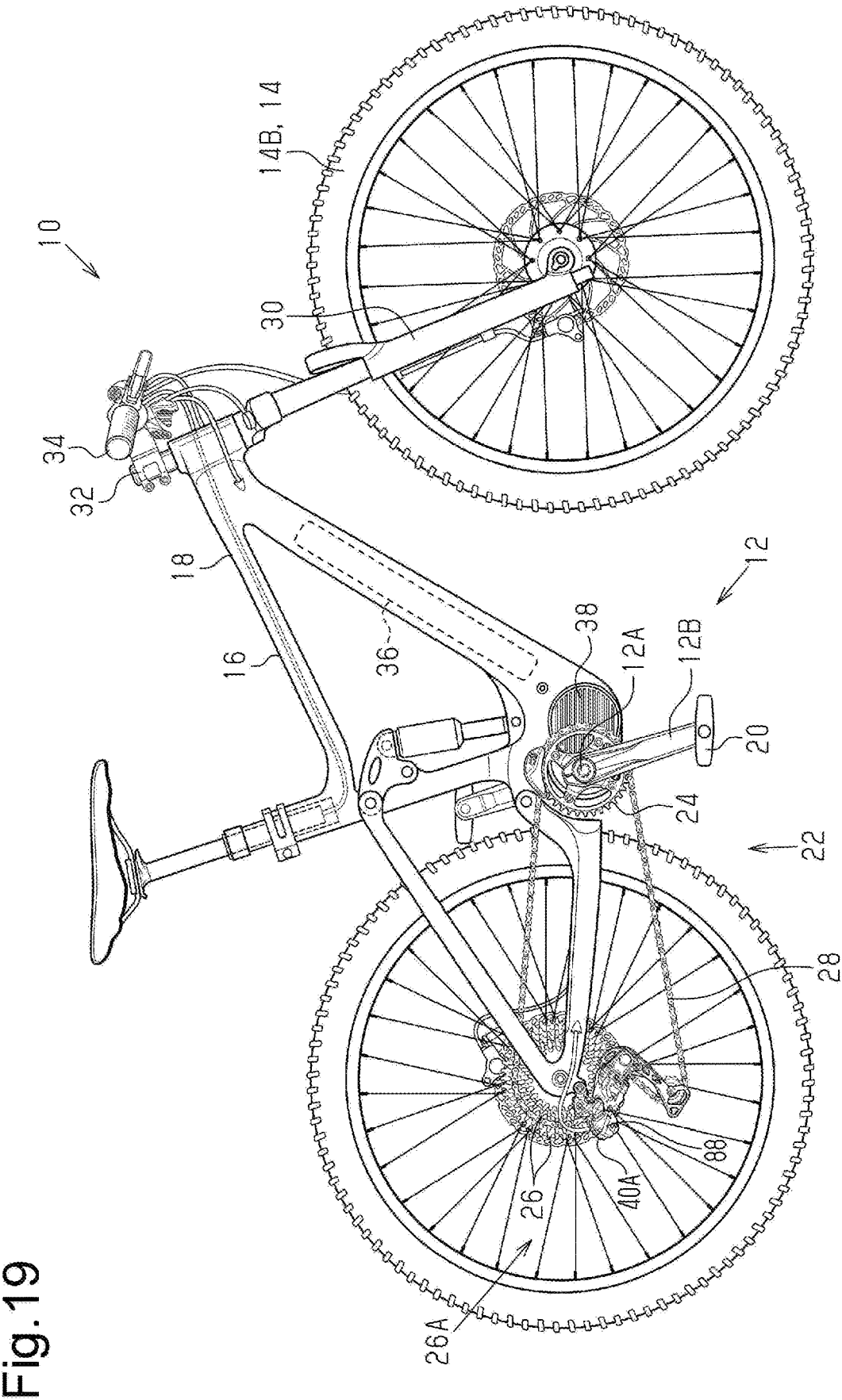
FIG. 19 is a side view of a human-powered vehicle including a first modified example of a human-powered vehicle derailleur.

As shown in FIG. 19, the derailleur 40 can be changed to a derailleur 40A further including a motor 88 configured to move the movable member 44 relative to the base member 42. Preferably, the motor 88 is provided on the base member 42. The motor 88 can be provided on at least one of the movable member 44, the linkage structure 46, and the pulley assembly 48. The motor 88 can be configured to be supplied with electric power from the battery 36 disposed apart from the derailleur 40. In a case in which the derailleur 40 includes the motor 88, preferably, the human-powered vehicle 10 includes a control device. The control device can be provided on the derailleur 40. The control device includes an arithmetic processing device that executes a predetermined control program. The arithmetic processing device includes, for example, a central processing unit (CPU) or a micro processing unit (MPU). Arithmetic processing devices can be provided at different positions separate from each other. The control device can include one or more microcomputers. Preferably, the control device further includes storage. The storage stores information used for various control programs and various control processes. The storage includes, for example, a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Figure 20:
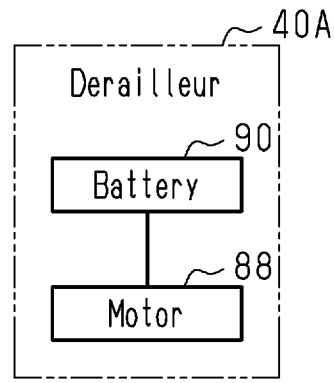
FIG. 20 is a block diagram showing the electrical configuration of a human-powered vehicle including a second modified example of a human-powered vehicle derailleur.

In the modified example shown in FIG. 19, the derailleur 40A can further include a battery 90 that supplies electric power to the motor 88 as shown in FIG. 20. Preferably, the battery 90 is provided on the base member 42. The battery 90 can be provided on at least one of the movable member 44, the linkage structure 46, and the pulley assembly 48.

Figure 21:
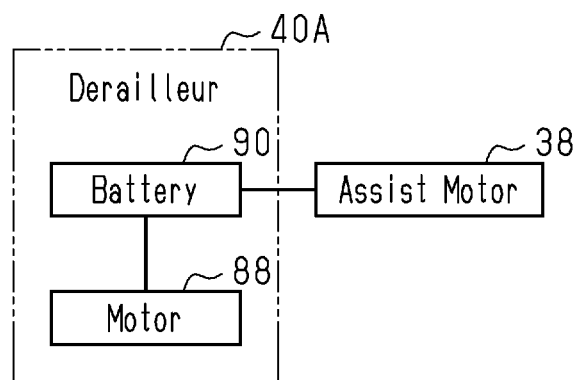
FIG. 21 is a block diagram showing the electrical configuration of a human-powered vehicle including a third modified example of a human-powered vehicle derailleur.

As shown in FIG. 21, the battery 90 can further be provided to supply electric power to the assist motor 38 configured to apply propulsion force to the human-powered vehicle 10. The modified example shown in FIG. 21 can be applied to the derailleur 40 that has the motor 88 and the derailleur 40 that does not have the motor 88.

Figure 22:
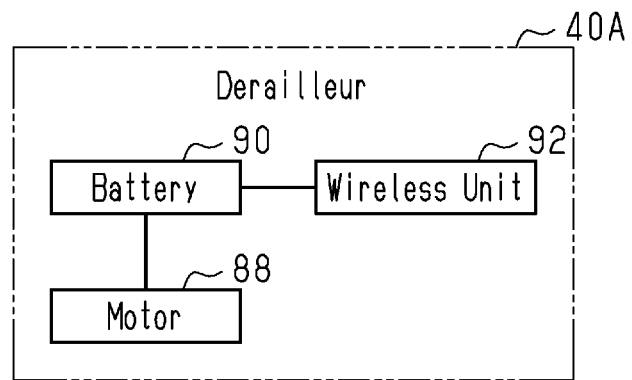
FIG. 22 is a block diagram showing the electrical configuration of a human-powered vehicle including a fourth modified example of a human-powered vehicle derailleur.

As shown in FIG. 22, the derailleurs 40 and 40A can further include a wireless unit 92 configured to perform wireless communication with an electric component of the human-powered vehicle 10. Preferably, the wireless unit 92 is provided on the base member 42. The battery 90 can be provided on at least one of the movable member 44, the linkage structure 46, and the pulley assembly 48. The wireless unit 92 can be detachably attached to the derailleurs 40 and 40A.

In this specification, the phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

DESCRIPTION OF REFERENCE CHARACTERS 10) human-powered vehicle, 18) frame, 26) sprocket, 26A) rear sprocket assembly, 36) battery, 38) assist motor, 40) derailleur, 42) base member, 44) movable member, 46) linkage structure, 48) pulley assembly, 48X) pivot axis, 54) first pulley, 56) second pulley, 50) rotational force control structure, 60) cam member, 60A) first cam surface, 60B) second cam surface, 60C) transition portion, 62) abutment member, 62X) rotational axis, 64) biasing member, 66) pulley assembly biasing member, 70) resistance applying member, 72) resistance applying member, 74) contact member, 76) first biasing member, 78) second biasing member, 80) pulley assembly biasing member, 82) first biasing member, 82X) first end portion, 82Y) second end portion, 84) second biasing member, 84X) third end portion, 84Y) fourth end portion, 88) motor, 90) battery, 92) wireless unit

The invention claimed is:

1. A human-powered vehicle derailleur, comprising:
a base member configured to be attached to a human-powered vehicle frame;
a movable member movable with respect to the base member;
a pulley assembly pivotally attached to the movable member in a first pivotal direction and in a second pivotal direction opposite to the first pivotal direction, the pulley assembly including a first pulley having a first pulley axis and a second pulley having a second pulley axis;
a pulley assembly biasing member configured to bias the pulley assembly with respect to the movable member in the first pivotal direction;
a pulley distance (centimeter) being defined between the first pulley axis and the second pulley axis;
a biasing return force (newton) being defined by rotational force of the pulley assembly relative to the movable member, wherein the biasing return force is measured by the following steps:
fixing the base member and/or the movable member to a measurement device,
applying an external force to the pulley assembly to hold the pulley assembly at a predetermined holding position relative to the movable member under a condition in which the pulley assembly biasing member biases the pulley assembly with respect to the movable member in the first pivotal direction, and thereafter,
attenuating the external force to measure, as the biasing return force, the external force measured by the measurement device when the pulley assembly starts to move from the predetermined holding position in the first pivotal direction;
a return value being defined by the biasing return force multiplied by the pulley distance; and
an adjustment mechanism adjusting the biasing return force such that the return value becomes equal to or larger than 136 and equal to or smaller than 750.

2. The derailleur according to claim 1, wherein the return value is equal to or larger than 300.

3. The derailleur according to claim 1, wherein the pulley distance ranges from 4.55 centimeters to 15 centimeters.

4. The derailleur according to claim 1, wherein the pulley distance ranges from 7 centimeters to 14 centimeters.

5. The derailleur according to claim 1, wherein the biasing return force is equal to or larger than 30 newtons.

6. The derailleur according to claim 5, wherein the biasing return force is equal to or smaller than 50 newtons.

7. The derailleur according to claim 1, wherein
the pulley assembly biasing member includes a first end portion and a second end portion,
the first end portion is connected with the movable member, and
the second end portion is connected with the pulley assembly.

8. The derailleur according to claim 1, further comprising:
a motor configured to move the movable member relative to the base member.

9. The derailleur according to claim 8, wherein the motor is configured to be supplied with electric power from a battery disposed apart from the derailleur.

10. The derailleur according to claim 8, further comprising:
a battery configured to supply the motor with electric power.

11. The derailleur according to claim 1, further comprising:
a wireless unit configured to wirelessly communicate with a human-powered vehicle electric component.

12. The derailleur according to claim 1, further comprising:
a battery configured to supply electric power to an assist motor configured to apply propulsion force to a human-powered vehicle.

13. A human-powered vehicle derailleur, comprising:
a base member configured to be attached to a human-powered vehicle frame;
a movable member movable with respect to the base member;
a pulley assembly pivotally attached to the movable member in a first pivotal direction and in a second pivotal direction opposite to the first pivotal direction, the pulley assembly including a first pulley having a first pulley axis and a second pulley having a second pulley axis;

a pulley assembly biasing member configured to bias the pulley assembly with respect to the movable member in the first pivotal direction;

a pulley distance (centimeter) being defined between the first pulley axis and the second pulley axis;

a biasing tension force (newton) being defined by rotational force of the pulley assembly relative to the movable member, wherein the biasing tension force is measured by the following steps:

fixing the base member and/or the movable member to a measurement device, applying an external force to the pulley assembly to hold the pulley assembly at a predetermined holding position relative to the movable member under a condition in which the pulley assembly biasing member biases the pulley assembly with respect to the movable member in the first pivotal direction, and thereafter, increasing the external force to measure, as the biasing tension force, the external force measured by the measurement device when the pulley assembly starts to move from the predetermined holding position in the second pivotal direction;

a tension value being defined by the biasing tension force multiplied by the pulley distance; and an adjustment mechanism adjusting the biasing tension force such that the tension value becomes equal to or larger than 136 and equal to or smaller than 750.

14. The derailleur according to claim 13, wherein the tension value is equal to or larger than 300.

15. The derailleur according to claim 13, wherein the pulley distance ranges from 4.55 centimeters to 15 centimeters.

16. The derailleur according to claim 13, wherein the pulley distance ranges from 7 centimeters to 14 centimeters.

17. The derailleur according to claim 13, wherein the biasing tension force is equal to or larger than 30 newtons.

18. The derailleur according to claim 17, wherein the biasing tension force is equal to or smaller than 50 newtons.

19. The derailleur according to claim 1, wherein the adjustment mechanism includes a rotational force control structure configured to control the rotational force such that the return value becomes equal to or larger than 136 and equal to or smaller than 750.

20. The derailleur according to claim 13, wherein the adjustment mechanism includes a rotational force control structure configured to control the tension value such that the tension value becomes equal to or larger than 136 and equal to or smaller than 750.

21. A human-powered vehicle derailleur, comprising:

a base member configured to be attached to a human-powered vehicle frame;

a movable member movable with respect to the base member;

a pulley assembly pivotally attached to the movable member in a first pivotal direction and in a second pivotal direction opposite to the first pivotal direction, the pulley assembly including a first pulley having a first pulley axis and a second pulley having a second pulley axis;

a pulley assembly biasing member configured to bias the pulley assembly with respect to the movable member in the first pivotal direction;

a pulley distance (centimeter) being defined between the first pulley axis and the second pulley axis;

a biasing return force (newton) being defined by rotational force of the pulley assembly relative to the movable member, wherein the biasing return force is measured by the following steps:

fixing the base member and/or the movable member to a measurement device, applying an external force to the pulley assembly to hold the pulley assembly at a predetermined holding position relative to the movable member under a condition in which the pulley assembly biasing member biases the pulley assembly with respect to the movable member in the first pivotal direction, and thereafter, attenuating the external force to measure, as the biasing return force, the external force measured by the measurement device when the pulley assembly starts to move from the predetermined holding position in the first pivotal direction; and a return value being defined by the biasing return force multiplied by the pulley distance, wherein the return value is equal to or larger than 136 to restrict or prevent unintentional pivotal movement of the pulley assembly with respect to the movable member in the second pivotal direction due to external vibration.

* * * * *